E. RAMSAY.
TIPPLE.
APPLICATION FILED FEB. 4, 1918.
1,358,175.
Patented Nov. 9, 1920.
9 SHEETS—SHEET 3.
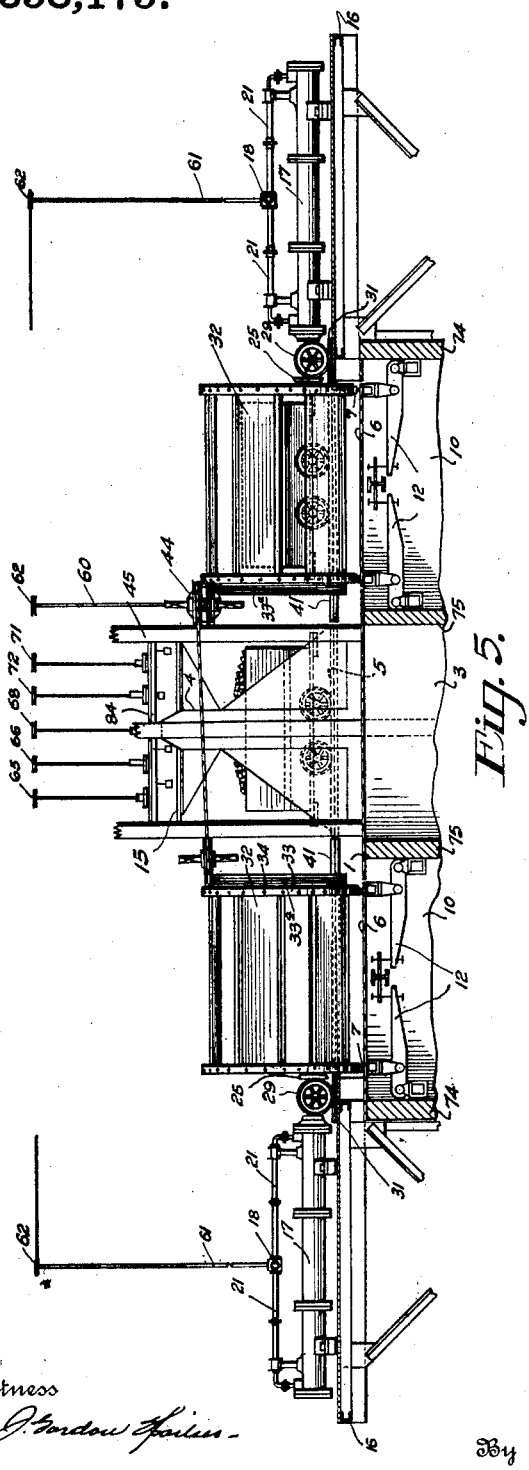
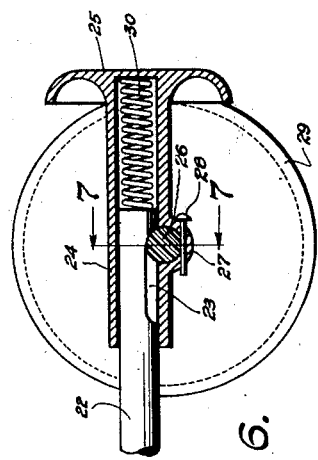
Inventor
Erskine Ramsay
Witness
Attorney

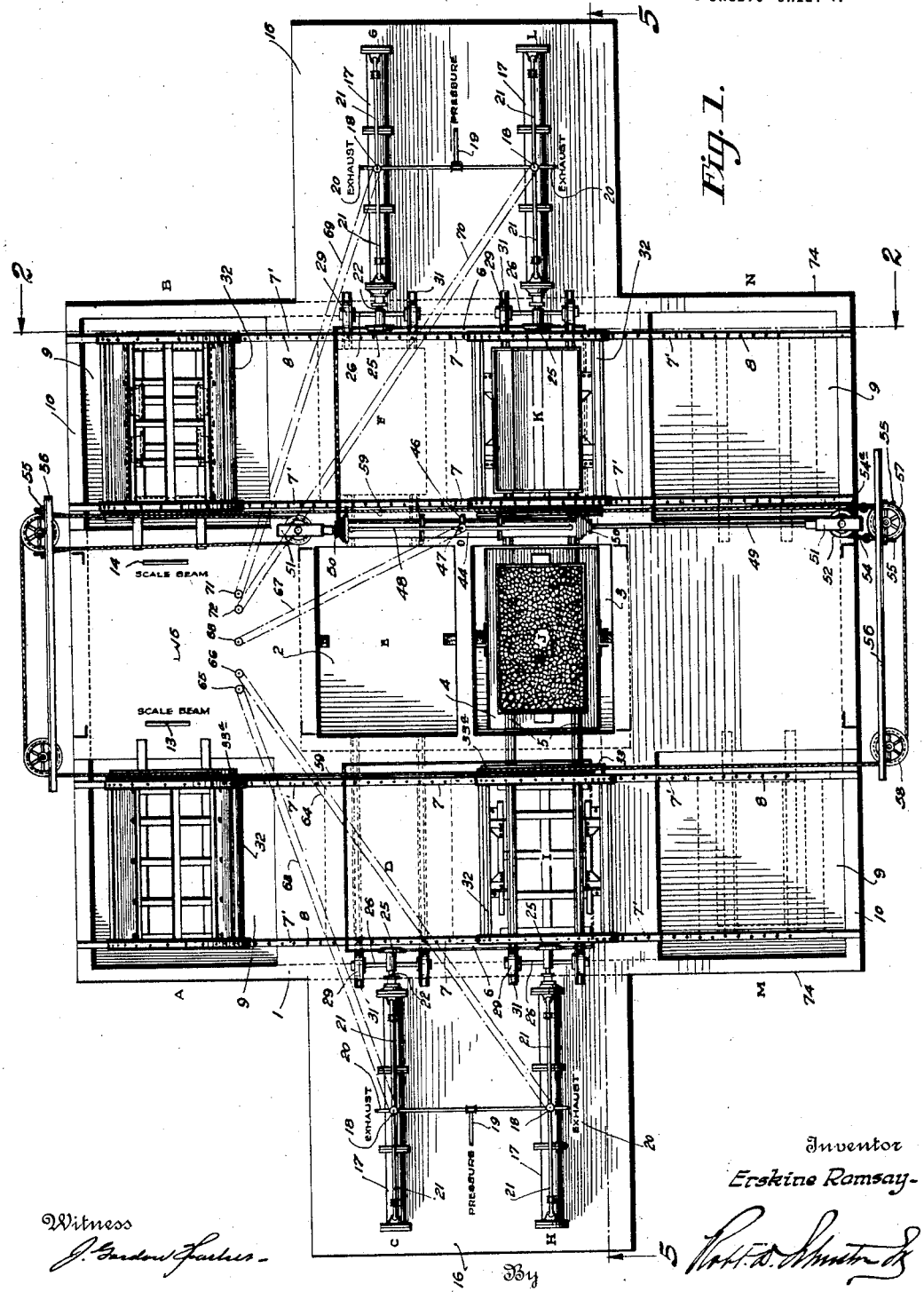

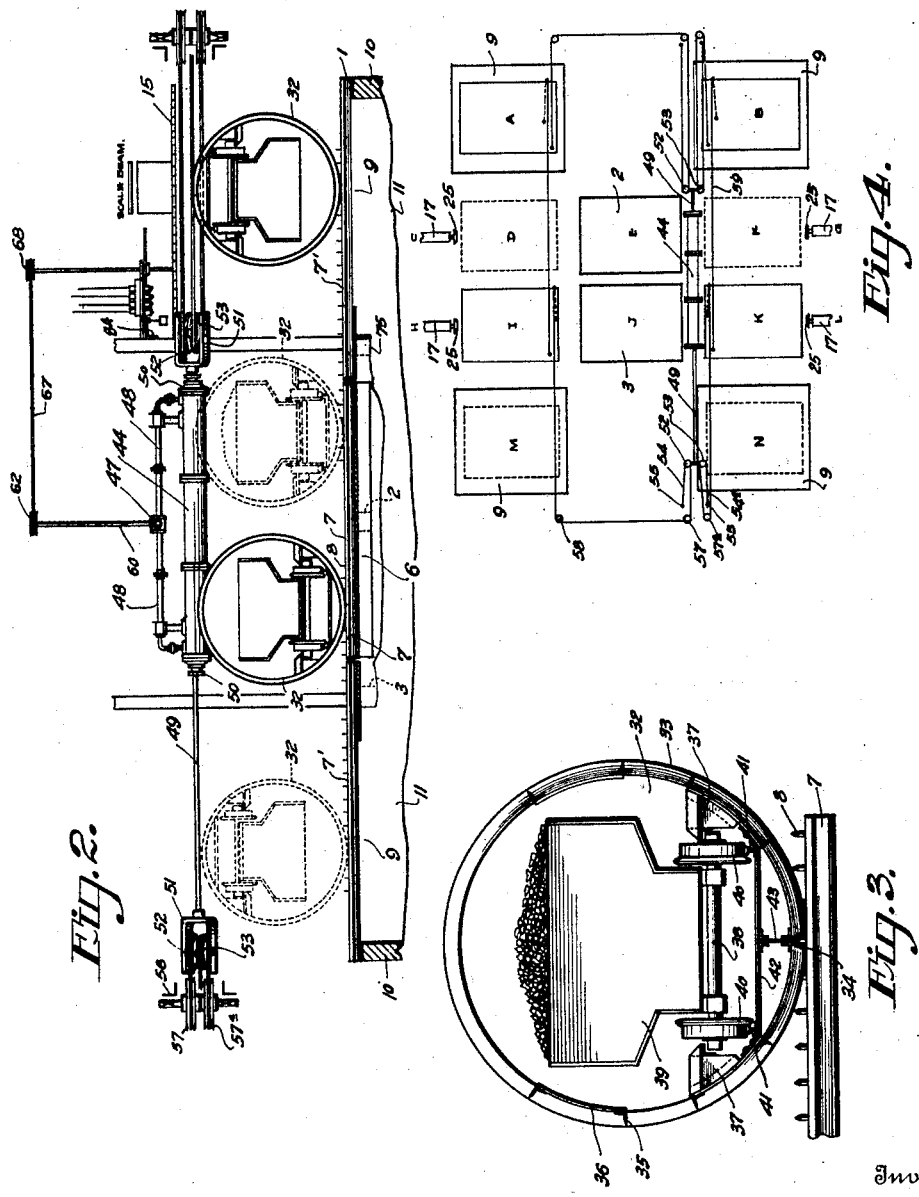

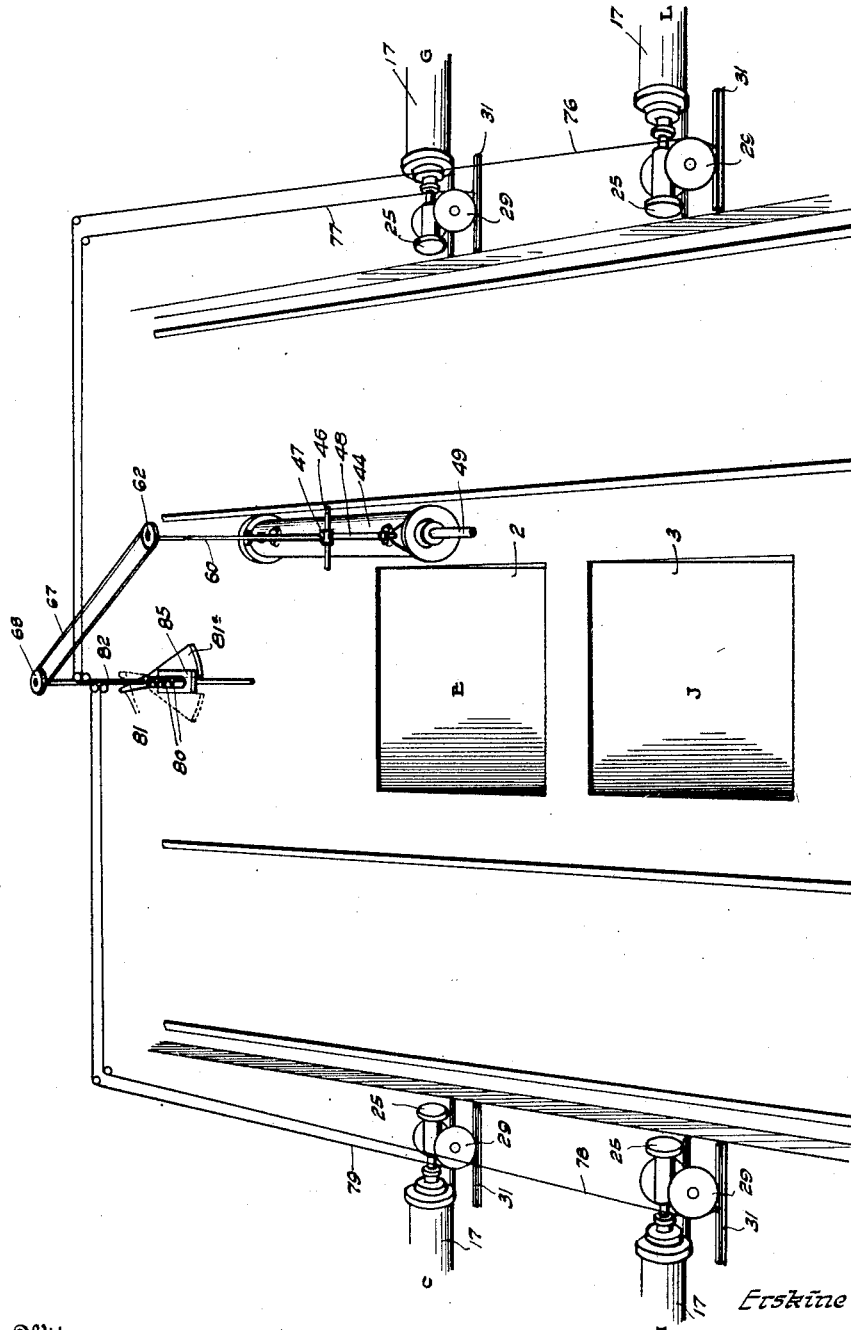

E. RAMSAY.
TIPPLE.
APPLICATION FILED FEB. 4, 1918.

1,358,175.

Patented Nov. 9, 1920.
9 SHEETS—SHEET 5.

Witness
J. Gordon Sparkes.

Inventor
Erskine Ramsay.

By
Ralph D. Johnston
Attorney

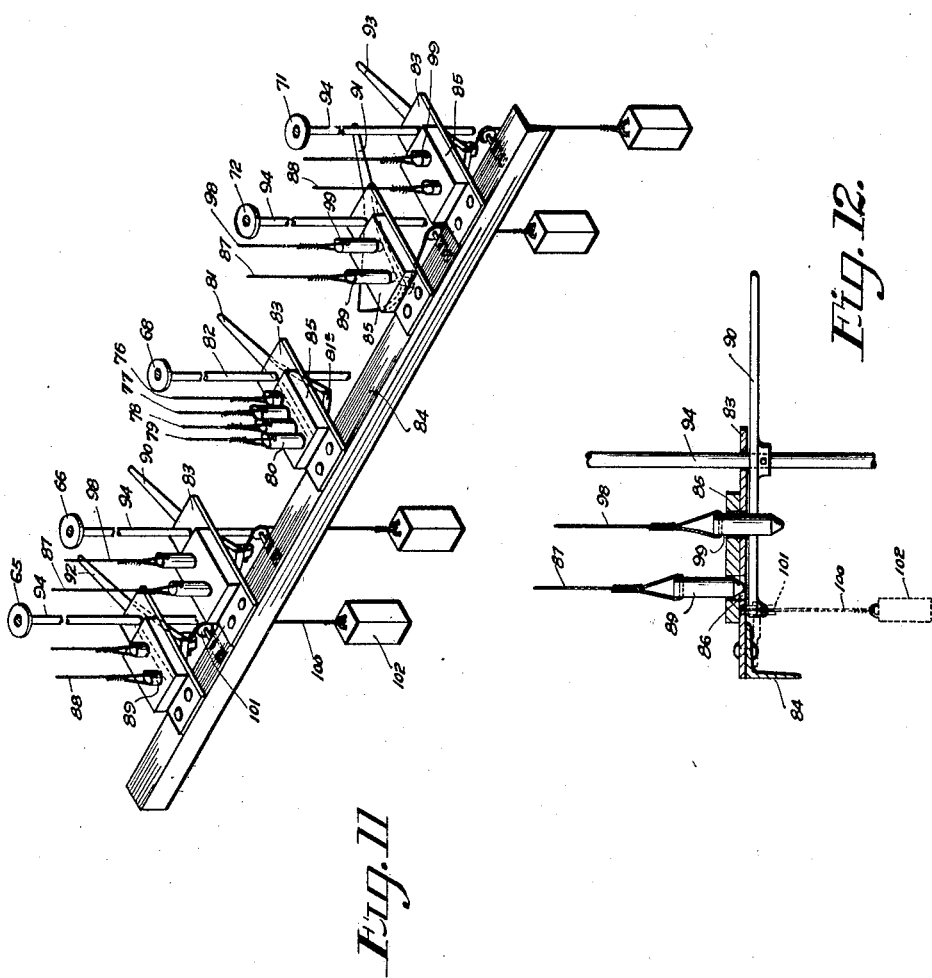

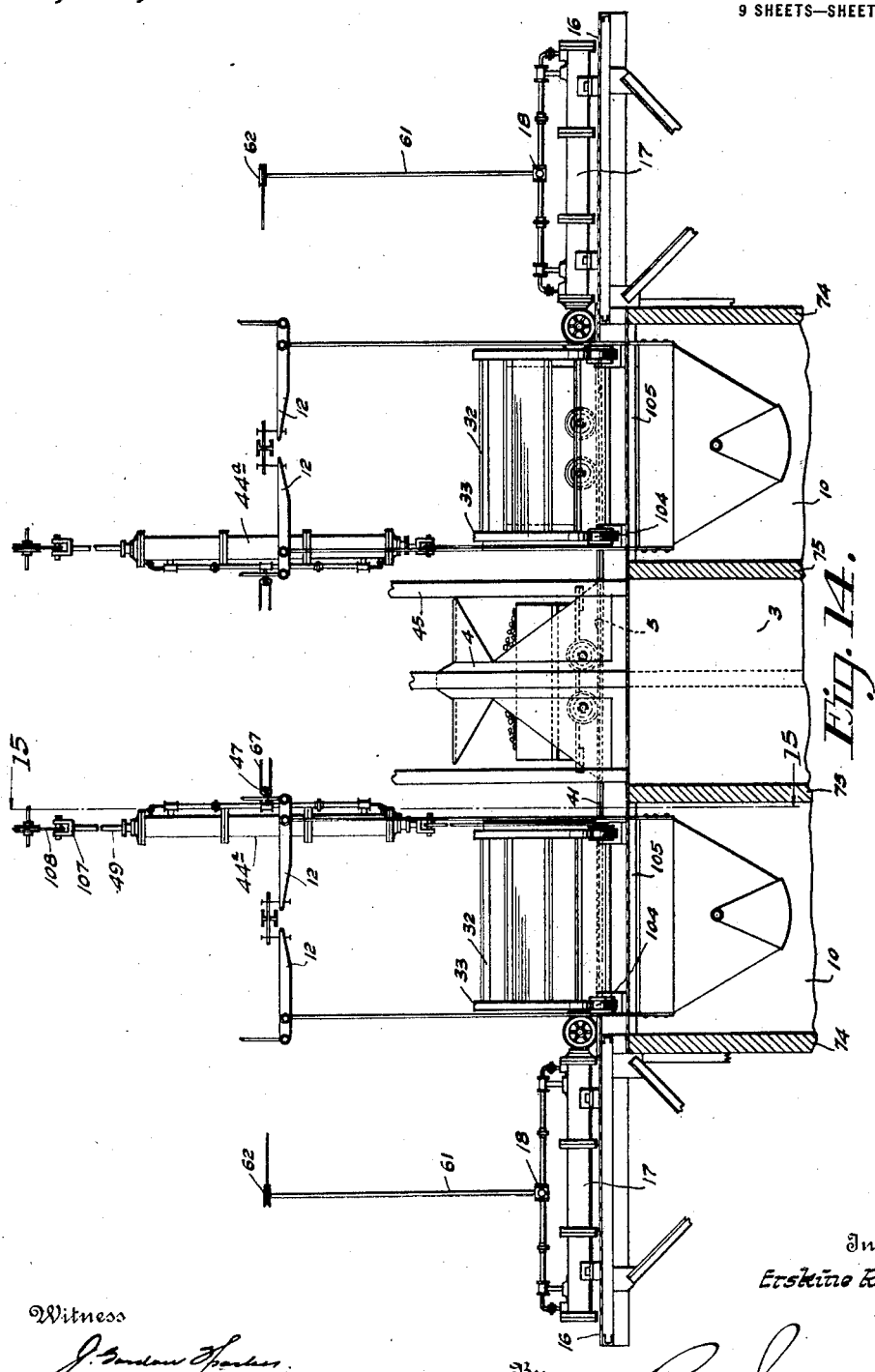

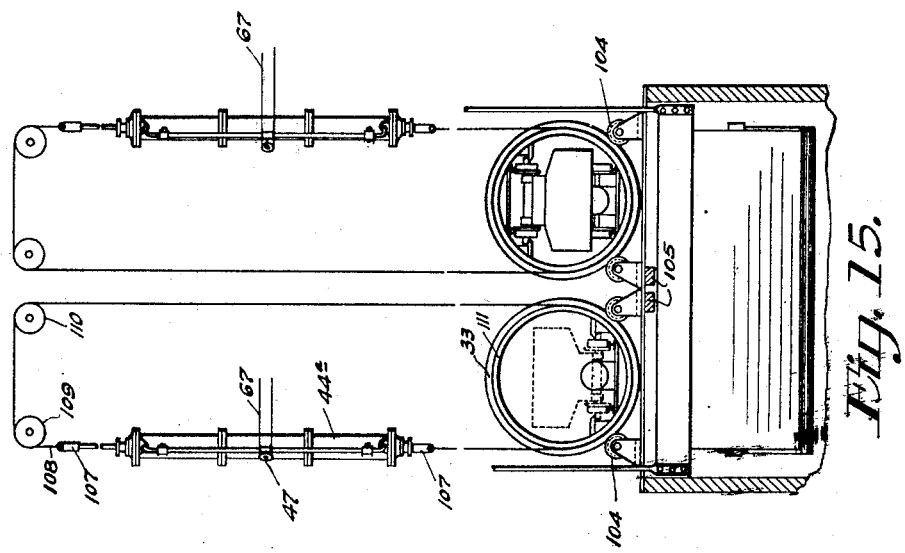

UNITED STATES PATENT OFFICE.

ERSKINE RAMSAY, OF BIRMINGHAM, ALABAMA.

TIPPLE.

1,358,175.   Specification of Letters Patent.   Patented Nov. 9, 1920.

Application filed February 4, 1918. Serial No. 215,346.

*To all whom it may concern:*

Be it known that I, ERSKINE RAMSAY, a citizen of the United States of America, residing at Birmingham, in the county of Jefferson and State of Alabama, have invented certain new and useful Improvements in Tipples, of which the following is a specification.

My present invention relates to a tipple structure designed for the economical dumping of mine cars by the combined action of rotary dumps and transfer rams by means of which the loaded and empty cars are transferred in a simple and rapid manner from the mine cage, (which term I use generically for all types of mine hoist mechanism) to the dumps and vice versa.

My invention is peculiarly, but not exclusively, adapted for use in connection with the dumping of mine cars raised on a cage or any like hoist or skip car to the tipple and it contemplates utilizing reciprocatory rams for shifting the mine cars between the cage and the adjacent rotary dump or dumps. In my preferred structure, rotary dumps are arranged on each side of the cage and the rams disposed to move an empty car, that has been dumped by one of the rotary dumps, onto the cage and force the loaded car last brought up on the cage into the rotary dump on the opposite side of the cage, the empty car being left on the cage. I thus make a double transfer of both empty and loaded cars in one operation, which leaves the cage with an empty car to be lowered, and the dump with a loaded car to be dumped.

A further feature of my invention relates to the very simple mechanism by means of which the rotary dumps on each side of the hoist mechanism are designed and adapted to move in unison and positively maintain their predetermined relative positions, all movements being preferably effected by one cylinder and a novel arrangement of cable connections from its piston to the rotary dumps.

My invention also contemplates the provision of a safety mechanism automatically controlled by the cage, the dumps and the rams to the end that until said elements are in proper position it will be impossible for the operator to move the rams or the dumps. This arrangement is designed with extreme simplicity so that it may be maintained without skilled labor, and in operation it will prevent accidents occurring by mistake or intention in the operation of the transfer or dumping mechanisms.

My invention also contemplates the adaptation of the dumps by giving them a rolling movement to dump at points spaced from their car receiving positions thereby to effect a very desirable distribution of the mineral in a large storage bin and avoid the necessity of manual labor or mechanism for its distribution therein.

Under certain conditions it may be desirable to dump the mine cars by rotary dumps which turn about a fixed axis and my present invention comprehends such an arrangement. The transfer of mine cars between cage and dumps is the same as in the rolling dump arrangement, but I prefer to simplify the weighing operation for the cars handled in the non-rolling rotary dumps by the provision of a weighing hopper disposed to receive the dumped mineral, one hopper serving two juxtaposed dumps. With the rolling rotary dump I prefer to use a scale platform on which the dump stands when receiving the loaded car from the cage, and off of which it rolls in moving to dump the car.

My invention further comprises the various novel details of construction and arrangements of parts which are hereinafter more particularly described and pointed out in the appended claims, reference being had to the accompanying drawings, in which:—

Figure 1 is a plan view of a tipple equipped with my improved dumping mechanism employing rolling dumps.

Fig. 2 is a sectional view taken on the line 2—2 of Fig. 1.

Fig. 3 is an enlarged end view of one of the dumps with a loaded car therein.

Fig. 4 is a diagrammatic view illustrating the operation of the dumps.

Fig. 5 is a sectional view taken on the line 5—5 of Fig. 1.

Fig. 6 is an enlarged detail view of one of the rams showing the lost-motion connection therein.

Fig. 7 is a sectional view on the line 7—7 of Fig. 6.

Fig. 8 is a perspective view of part of the automatic safety control mechanism for preventing the manipulation of the dumps when the rams are not in retracted position.

Fig. 11 is a detail perspective view of the control levers for the manipulation of the dumps and rams with the safety latch mechanism for preventing improper manipulation thereof.

Fig. 12 is a detail sectional view showing the latch mechanism for one of the ram controlling levers with a double latch mechanism in part released.

Figure 13:
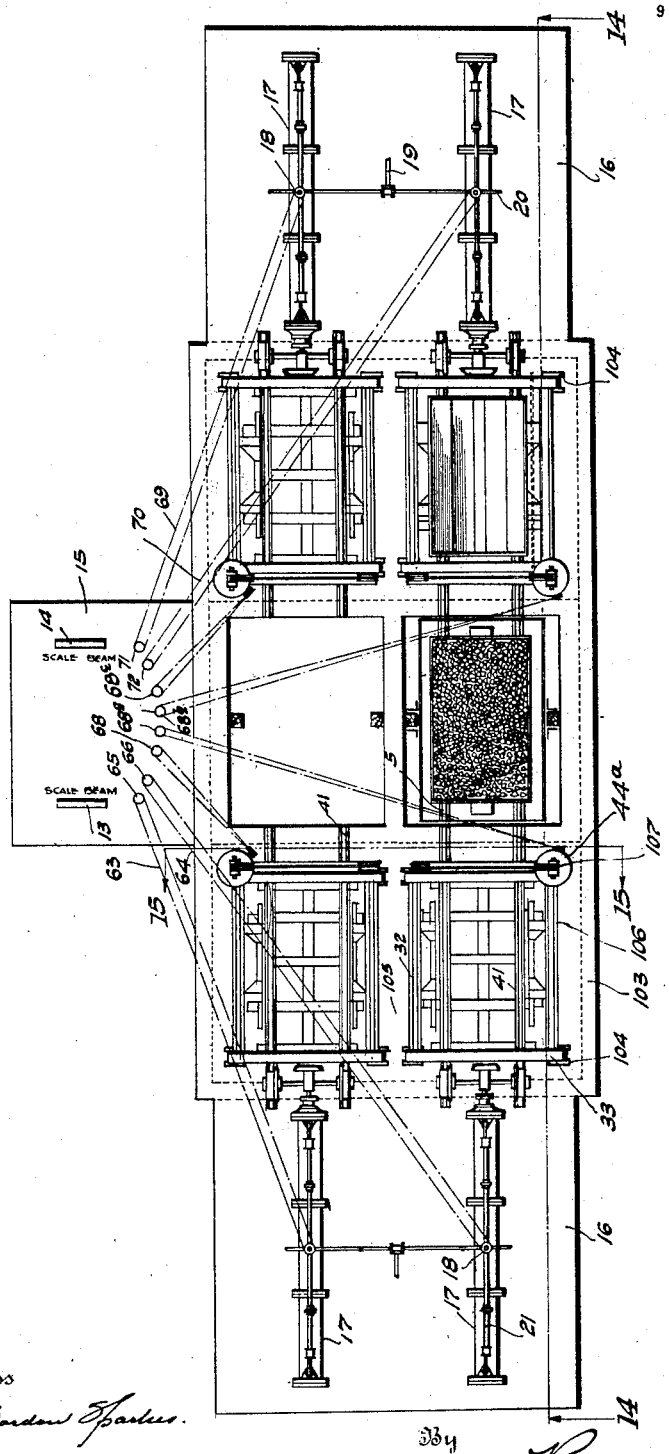
Fig. 13 is a plan view of a non-rolling rotary dump mechanism arranged for operation in accordance with my present invention.

Figs. 14 and 15 are sectional views taken on the lines 14—14 and 15—15 of Fig. 13.

Similar reference numerals refer to similar parts throughout the drawings.

I have illustrated my invention as adapted for use on the tipple of a shaft mine wherein the tipple platform 1 is provided with openings 2 and 3 over the mine shafts. In these shafts cages 4 of any well known construction are operated by any suitable hoist mechanism which, for the sake of clearness, is omitted from the drawings as the same forms no part of my present invention. Each cage carries rails 5 forming a track section extending from side to side of the cage and disposed in a horizontal plane. On the tipple structure on each side of the shaft openings I arrange a scale platform 6 and forming parallel tracks 7 across the scale platforms are rails having equi-distantly spaced vertical pins 8 mounted in the tread thereof. These tracks 7 on the scale platforms aline at each end with an extension track 7', each of which is sufficient in length to project over its respective dump opening 9 in the tipple platform. These tracks 7' preferably extend entirely across the dump openings 9 and are supported on the walls 10 forming the end supports of the tipple and also the end walls of the mineral storage bin 11 beneath the several dump openings. The tracks 7' also are provided with pins 8 throughout the major portion of their length and with the tracks 7 form parallel tracks disposed at right angles to and on opposite ends of the tracks 5 on the cages. The scale platform is mounted upon any suitable scale mechanism 12, the scale mechanism to the left of the shaft (Fig. 1) being suitably connected to and adapted to operate the scale beam 13 while the scale mechanism to the right of the shaft operates the scale beam 14 on the operating platform 15 of the tipple.

The tipple platform is provided opposite each scale platform with an extension 16 upon each of which is mounted a pair of steam or compressed air cylinders 17 having any suitable valve control mechanism 18 to which fluid pressure is supplied by pipes 19 and from which the exhaust is conducted by pipes 20. The fluid pressure is conducted from each valve 18 by pipes 21 to each end of its respective cylinder, the valve being of suitable four-way type to deliver pressure to one end of the cylinder as it exhausts pressure from the opposite end so as to effect a reciprocation of a piston therein which operates a piston rod 22 (see Figs. 6 and 7). Each piston rod 22 has its outer end, which is cut away to form a notch 23, inserted in the open end of a tubular casting 24. This casting is closed at its other end by the ram or pusher head 25 and it is mounted at an intermediate point on an axle 26 which passes through a bearing seat 27 provided therefor and arranged to intersect the bore of the casting 24 so that the upper portion of the axle will engage in the notch 23 in the piston rod. A pin 28 is passed through the seat 27 and through a notch in the axle 26 and serves to prevent lateral displacement of the casting on the axle. Wheels 29 are mounted to rotate on the outer ends of the axle and a coiled spring 30 is interposed in the bore of the casting between the head 25 and the end of the piston rod 22. The notch 23 is elongated so that when the ram head engages or is engaged by an object the casting is free to shift lengthwise of the piston rod the full length of the notch, this relative movement being resisted by the spring 30 and the whole forming a spring buffer or bumper of very simple construction. Each of these rams when in retracted position with the piston at the cylinder end farthest from the shaft will rest upon a short track section formed by the rails 31 which are mounted upon each extension platform 16 and are disposed in alinement with the track rails 5 on the cages. The extensions 16 are raised substantially above the level of the main tipple 1 for the purposes hereinafter described.

On each scale track 7 and its extension track 7' I mount two rotary dumps 32, each formed by metal rings 33 which in their outer peripheries are provided with radial holes 34 suitably spaced to receive the pins 8 on the rails 7 of the tracks 7, 7'. The rings of each dump are cross connected by angle bars 35 and plates 36 and also by hold-down castings 37 disposed to overhang the ends of axles 38 on mine cars 39 where they project beyond the wheels 40. These hold-downs will also engage the hubs of the ram wheels 29 when in the dump, as said wheels are similar to the car wheels. The rams also form cushion bumpers for cars pushed against them in the manner hereinafter described. Each dump carries a track section formed by rails 41 suitably mounted on bars 42 and extending the length of the dump. The bars 42 are riveted at their ends to the rings and are braced in their centers by a structural I-bar 43 extending lengthwise of the dump and mounted on the rings. The specific structure of the rotary dump is not important and may be widely varied, it being only essential that it carry annular members provided with means to prevent slippage of the dump as it rolls back and forth on the tracks 7, 7'. The dump rails 41 are disposed at the same level as the track rails 31 on which the rams normally rest and it will be noted, particularly in Fig. 5, that the rails 41 of each dump project sufficiently beyond its end toward the cage to form continuations of the cage track rails 5 when the cage and dump are in position for the transfer of a car in either direction from one to the other.

It is intended that the dumps on each dump track 7, 7' shall move together and preserve their relative spacing which is such that when either dump (see Fig. 2) is in car receiving or discharging position opposite a cage, the other dump is in inverted position over its respective dump opening 9, and when the latter dump has been rolled back into car receiving and discharging position opposite a cage, the first mentioned dump has moved to dumping position over its respective dump opening 9. This preservation of the relative spacing of the dumps and their joint movement obtained by the operating mechanism will now be described in its preferred embodiment.

The movement of the dumps is controlled by a cylinder 44, preferably mounted by any suitable supports on the superstructure 45 above the tipple platform. Steam, air or other suitable fluid pressure is conducted to this cylinder by a pipe 46 and, under control of a four-way valve 47, is directed through piping 48 to the desired end of the cylinder, the opposite end being opened by the valve to the exhaust. A piston reciprocable within the cylinder serves to operate the piston rod 49 which projects through suitable glands 50 from each end of the cylinder 44 and carries at each end a yoke 51 in which two sheave wheels 52 and 53 are mounted to rotate independently. The arrangement at each end of the cylinder and piston rod being the same, only one will be described in detail. A cable, chain or suitable flexible connection 54 (Fig. 1) is made fast at one end to an adjusting screw 55 mounted in overhead frame work 56 and from this point of connection the chain or cable passes around the sheave 52, see Fig. 2, then about the idler sheaves 57 and 58 and finally is passed half way around the sheave $33^a$ on the near end ring 33 of the dump 32 occupying the position designated I in Figs. 1 and 4, and is made fast thereto. In like manner a chain or cable $54^a$ is made fast to an adjusting screw 55 and passed around the sheave 53, then around the idler sheave $57^a$ and half way about the sheave $33^a$ on the near end ring 33 of the dump 32 occupying the position designated K in Figs. 1 and 4, and is there made fast. By exactly the same arrangement of cables, sheaves and idlers, the other two dumps occupying the positions A and B in Figs. 1 and 4, are connected to the other end of the piston rod 49 and adapted to be operated by the movement of the sheave wheels 52 and 53. In order to preserve the relative spacing of the pair of dumps on the same side of the shaft, they are connected by a chain or cable 59 made fast to the sheaves $33^a$ at corresponding ends of the dumps and passed in opposite directions about the dump sheaves so that as the cable is wound onto one dump it is unwound from the other and vice versa. This causes the dump that is being rolled by the cylinder to draw after it the other dump which in turn winds up the slack in the operating cable 54 or $54^a$, which at the time is being paid out by the movement of the piston. The pin and socket engagement between the dumps and their tracks on which they move acts like a cog and rack positively to prevent any slippage or relative movement which would disturb the predetermined spacing of the dumps. It is also to be noted that the pairs of dumps on both sides of the shaft preserve the same relative positions as they move together back and forth from car receiving to car dumping positions.

The valve 47 controlling the cylinder 44 and the several valves 18 controlling the four ram cylinders 17, are adapted to be operated by vertical stems 60 and 61, respectively. Suitable supports (not shown) are provided for these stems and each at its upper end carries a pulley 62 to which an endless operating cable is made fast. The operating cables 63 and 64 for the two left hand cylinders 17 (Fig. 1) are keyed to and made fast to pulleys 65 and 66 mounted in convenient position to be operated from the platform 15. The cable 67 for controlling the cylinder 44 is controlled by a pulley 68 from the platform 15 and the two right hand cylinders 17 are controlled by cables 69 and 70 which are operated by pulleys 71 and 72, respectively, from the platform 15. By this arrangement one operator on the raised platform 15 can observe the scale beams, oversee the weighing of the loaded cars on both sides of the tipple, and control by the remote connections described the operation of the dumps and rams, thus being able to maintain complete supervision and control over the operation of the dump as a whole.

The operator's platform 15 is spaced substantially above the level of the tipple platform 1, thus placing him in convenient position for overlooking and observing the operation of the dump and simplifying the operating mechanism for the overhead cables employed for controlling the various valves and for the safety appliances hereinafter described.

The tipple platform 1 is supported by the marginal walls 10 and 74 forming the outer wall of the large bin which has a central wall or well 75 surrounding the shaft and supporting the tipple platform and hoist rigging at the center of the tipple. The rolling action of the dumps will obviously effect a very satisfactory distribution of the mineral about such a large storage bin.

In order to make clearer the relative movements of the different mechanisms thus far described, I make use of reference letters on Figs. 1 and 4 to designate positions of the dumps, cages and rams. We will assume the parts in the position shown in Fig. 1, which is diagrammatically illustrated in Fig. 4, and that the dumps in positions B and K carry empty mine cars while the dumps in positions A and I are empty. The cage in position J is up with a loaded car while the cage in position E is down. The dumps in positions I and K stand opposite the loaded car while the dumps in positions A and B are inverted over their respective dumping openings 9. The operator first manipulates the pulley 72 to cause the ram controlled thereby in position L to advance its plunger and move the empty car from the dump at position K onto the cage in position J. As the empty car enters this cage it is pushed against the loaded car thereon, causing the latter to be moved into the empty dump in position I while the empty car remains on the cage ready to be lowered. The pulley 72 is again manipulated to retract the ram and the operator signals to lower the cage in position J with the empty car and to raise the other cage with a loaded car to position E. While this operation is taking place, the pulley 68 is manipulated to reverse the position of the piston in the cylinder 44, which acts by the cable connections already described to roll the dumps from positions A, B, I and K to positions D, F, M and N, thus moving dumps from inverted to upright positions opposite the cage with the loaded car in position E. As the dump with the loaded car rolls from position I to position M, it gradually inverts the car and dumps its contents, the car remaining in inverted position until the next operation of the dumps. In this operation the dump leaving position K is empty. A car previously dumped stands in the dump in position F, whereupon the operator manipulates the pulley 71 and causes the ram in position G to force this empty car onto the cage in position E and to force the loaded car therefrom into the empty dump in position D. The empty car left on the cage in position E is then lowered and a loaded car is brought up on the cage in position J and while this takes place the pulley 68 is manipulated to reverse the piston in the cylinder 44 which rolls the dumps back from positions D, F, M and N to the positions A, B, I and K, or as shown in Fig. 1. The dump with the loaded car in rolling from position D to position A will dump its contents while the car previously dumped moves from inverted position at M to upright position at I. As the next loaded car comes up into position J it is transferred by operating the pulley 66, causing the ram controlled thereby in position H to force the empty car from the dump in position I onto the cage and transfer the loaded car from the cage in position J to the dump in position K. The final transfer of each cycle is made by shifting the empty car from the dump in position D onto the cage in position E and pushing a loaded car ahead of it onto the dump in position F.

It will thus be seen that as the cages alternately present their loaded cars to be dumped the pairs of dumps move in parallelism back and forth and the rams are operated in succession, in each instance making use of an empty car while forcing it onto the cage to push a loaded car ahead of it off of a cage and into a dump.

To summarize, assuming an empty car in each dump in positions B and K, and using the position reference letters to indicate dumps, the cycle of car shifts is:—

An empty from K and a load into I,
An empty from F and a load into D,
An empty from I and a load into K,
An empty from D and a load into F, it being understood that the four dumps are shifted between each car shift and in rotation dump coal at the four corners of the bin through the holes 9.

Under many circumstances it will be desirable to provide a safety mechanism to prevent the improper operation of the apparatus which might occur through carelessness, defective mechanism, or otherwise and to this end I have designed the safety mechanism illustrated in Figs. 8 to 12, from which figures it will be observed that for the sake of clearness I have omitted all such parts of the mechanism as are not connected with the particular control illustrated in each view.

Referring to Fig. 8 I show the mechanism employed for preventing the operation of the cylinder 44 which moves the dumps until the several rams have been retracted into position to clear the dumps. I provide four controller cables 76, 77, 78 and 79, each of which is made fast at one end to a rail 31 or like support in such position that it will be engaged and drawn outwardly by one of the rams, preferably by engagement with a ram wheel 29. Each ram thus automatically controls one of these cables and all of the cables pass around suitable pulleys and are each made fast at its other end to its respective counter-weight 80, see Fig. 11. These four counter-weights are of such size as to maintain the tension on the cables and each counter-weight, whose supporting cable is retracted by its respective ram, is thereby raised sufficiently to clear the path of a lever 81 which serves to turn the shaft 82 on which the pulley 68 is fast. The lever has a sector shaped end 81ª extending beyond the shaft 82 and so shaped that when the lever is thrown to either side to shift the control valve for the cylinder 44 into position to roll the dumps to one end or the other of their travel, the several counter-weights 80 will hang in position where if any one of them is down it will prevent a reverse movement of the lever. The shaft 82 is mounted to turn in the outer end of a plate 83, see Fig. 11, made fast at its other end to an angle iron 84 and carrying on its upper face a bar or block 85 secured thereto. Holes 86 are drilled through the parts 83 and 85 to form guides for the counter-weights 80, the lower rounded ends of which hang normally therein. Each weight moves up or down responsive automatically to the position of the part that controls it. When a part is in abnormal position, as will be seen in Fig. 12, its counter-weight is down and projects sufficiently below the plate 83 to engage the lever and block its movement. In other words, when any one of the rams has moved forward it releases its pressure against its respective cable 76, 77, 78 or 79 and permits its respective weight 80 to drop into the path of the lever 81 and prevents it being moved to reverse the cylinders until the ram has moved back to its retracted position. This prevents any dump being moved when any ram is in its path.

Figure 9:
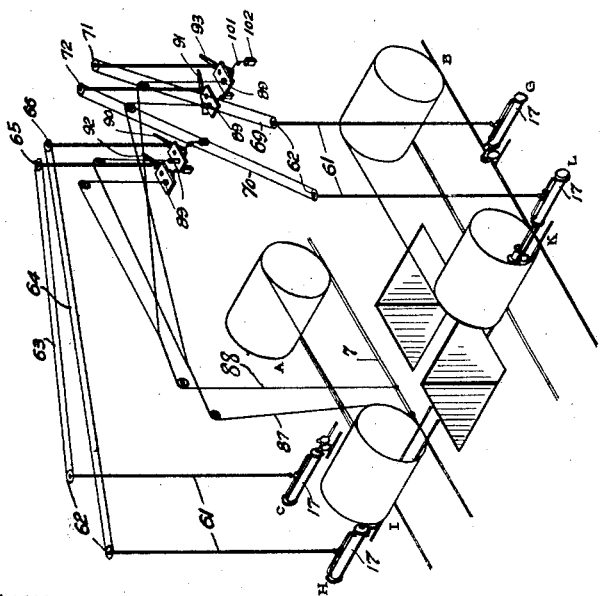
Fig. 9 is a perspective view of that part of the automatic safety control mechanism which serves to prevent the manipulation of the rams until the dumps are in proper position relatively thereto.

It is obviously necessary to prevent the operation of the rams until the dumps are in proper position relative thereto and to this end I have designed the apparatus shown in Fig. 9, which consists in providing two control cables 87 and 88, each having one end made fast to either dump track 7 or any equivalent support and in such position that when one dump of a pair is in car receiving position it will engage and deflect its respective cable and when the other dump of the pair is in receiving position it will engage and deflect its respective cable. The cables pass around suitable pulleys or guides and branch, each leading to two counter-weights which control the manipulation of the control levers for the two rams opposite the dump which deflects it. Thus in Fig. 9 the dumps to be loaded or emptied are in the positions I and K and one of them serves to operate cable 87 to raise the counter-weights 89 that would otherwise block the operation of the levers 90 and 91, which manipulate the pulleys 66 and 72 controlling the rams in positions H and L. In like manner the dumps shown in positions A and B control the cable 88, the branches of which support counter-weights 89 disposed to control the operation of levers 92 and 93 which operate pulleys 65 and 71 controlling the rams in positions C and G. As seen in Fig. 11, the several pulleys 65, 66, 72 and 71 are mounted on shafts 94 which turn in the outer ends of plates 83 mounted on the angle iron 84 and each plate carries the bar or block 85 through which is provided two holes, one hole in each plate forming a guide for one of the counter-weights 89.

Figure 10:
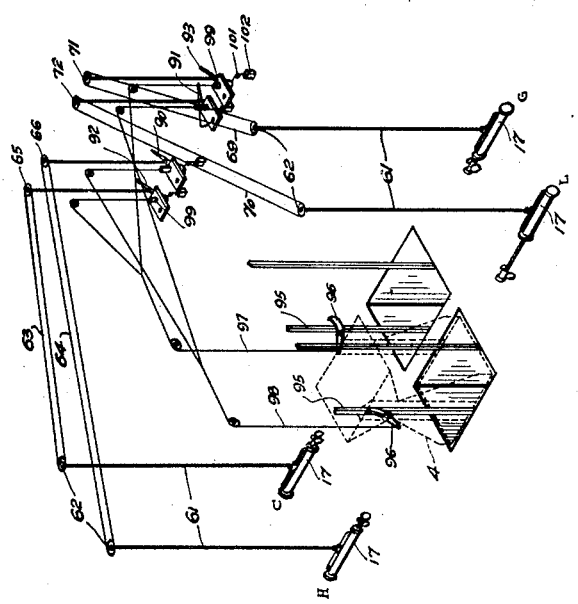
Fig. 10 is a perspective view of that part of the automatic safety control mechanism which prevents the manipulation of the rams until the cage is in proper position relatively thereto.

It is necessary to provide additional safety means for preventing the operation of any ram when in a mine cage 4 is not in position for receiving or discharging cars responsive to the operation of such ram. Such a safety appliance is shown in Fig. 10, where I mount on a cage guide 95 for each cage a lever 96 having its inner end disposed to be engaged and rocked outwardly when in car transfer position and having its outer end connected to a cable 97 or 98, as the case may be, the cable 97 branching to and controlling counter-weights 99 for blocking the ram controlling levers 92 and 93, the cable 98 branching to and controlling counter-weights 99 which in turn are adapted to block the operation of the ram controlling levers 90 and 91. These counter-weights 99 are arranged to work in the outer holes provided therefor in the blocks 85 and plates 83 for the several pulley shafts 94. The sector shaped ends of the levers 90, 91, 92 and 93 is such that they ride under and prevent a counter-weight dropping in all positions except when the lever is in position for retracting the ram controlled thereby. In order to automatically return the several levers to this position so as to prevent a ram being left in advanced position, I attach to each of the levers its respective cord 100 which travels over a pulley 101 suitably mounted on the angle bar 84 and supporting a counter-weight 102 at its lower end. These counter-weights, as shown in Fig. 12, normally hold all of the valves controlling the ram cylinders 17 in position to retract the rams and it will be obvious that the counter-weights 89 and 99 for each ram controlled lever must be in raised position to permit the lever to be operated to advance the ram controlled by it and unless the dumps and cage are both in proper position it is not possible for either ram opposite them to be operated.

In Figs. 13 to 15 I have illustrated a modification of my invention involving a simpler and less expensive tipple and dump which however is capable of performing the same operations as have just been described in detail. In these constructions the tipple platform 103 is narrower than the platform 1 but is provided with similar end extensions 16 and with the raised operator's platform 15 carrying the scale beams 13 and 14. The rams 17 and their controlled mechanisms are similar to that already described and the same is true of the rotary dumps 32 and their tracks 41 with forward extending rails which are adapted to form continuations with the tracks 5 on the cages. The dumps in this construction however are intended to rotate about a fixed axis and not to roll and for this reason the tracks 7, 7' are dispensed with and the dumps are supported on flanged rollers 104 which engage the ring members 33 of the dumps, these rollers on the adjacent sides of the dumps being supported on a cross beam 105 extending across the dumping opening 106 in the platform beneath the two dumps. The rollers for the remote sides of the dumps are mounted in suitable bearings made fast to the platform. Each dump in this arrangement is preferably operated independently by the following mechanism which being described for one dump will apply to the others, namely, each dump will have its cylinder 44$^a$, corresponding to cylinder 44, disposed vertically adjacent to its end near the cage and the piston rod 49 will be connected at each end by a clip 107 to a rope 108 which, as seen in Fig. 15, passes upwardly about the pulleys 109 and 110 and then downwardly about a drum 111 on its respective dump 32 where it makes a turn and at its other end is connected to the clip 107 at the lower end of the piston rod. The length of the piston stroke is sufficient to give the dump a half rotation and its operation is controlled by the valve 47. In this arrangement the valve 47 for each of the cylinders 44$^a$ is controlled by its respective pulley 62 and each of these pulleys is connected by a controller cable 67 which leads to the four control pulleys 68, 68$^a$, 68$^b$, and 68$^c$ on the operator's platform. When desired to rotate any dump to discharge the contents of a loaded car at the time therein, the appropriate control pulley on the platform is manipulated to cause a reversal of the cylinder 44$^a$ controlling the loaded dump. In other respects, the operation of this dump corresponds to that already described and in particular the same sequence of car shifts is intended. If desired the safety appliances described in detail may be applied to this type of dump to render it proof against faulty operation.

This invention is not intended to be retricted in scope to the specific embodiments shown, but contemplates such modifications as come within the spirit and scope of the claims.

Having thus described my invention, what I claim as new and desire to secure by Letters Patent, is:—

1. In a dumping apparatus, a hoist mechanism for mine cars, rotary dumps on each side of said hoist mechanism, and means to transfer the mine car from the hoist mechanism to the desired dump.

2. In a car dumping apparatus, a hoist mechanism comprising a plurality of car supporting platforms, a plurality of rotary dumps disposed to coöperate with each platform in its raised position, and means to effect the transfer of cars in the desired direction between the hoist platform and its correlated dumps, substantially as described.

3. In a dumping apparatus, a hoist mechanism for mine cars, rotary dumps on each side of said hoist mechanism, and means to transfer the mine car from the hoist mechanism to either dump, said means being movable through the dumps and adapted to coöperate with an empty car in one dump to push the loaded car into the other dump.

4. In a tipple mechanism, a cage for raising and lowering mine cars having a transverse track thereon, rotary dumps on the tipple disposed at each end of said track when the cage is elevated, and track sections in the dumps adapted to form continuations of the cage track for the interchange of mine cars between cage and dumps, substantially as described.

5. In a tipple mechanism, a cage for raising and lowering mine cars having a transverse track thereon, rotary dumps on the tipple disposed at each end of said track when the cage is elevated, track sections in the dumps adapted to form continuations of the cage track, and means operative through the dumps to effect the transfer of cars from the dumps to the cage and vice versa.

6. In combination, a mine car hoisting mechanism comprising a cage having tracks thereon, a rotary dump carrying a track section adapted to form a continuation of the cage track, a reciprocable ram movable through the dump to force a car therein onto the cage, and a dumping apparatus on the other side of the cage adapted to receive and dump a loaded car pushed thereinto by the empty car when moved by said ram.

7. In combination, a plurality of cages for raising and lowering mine cars, track supports on the cages for the mine cars, a plurality of rotary dumps disposed on each side of the cages when in raised position, track sections in said dumps adapted to form continuations of the cage tracks, and rams operable through the dumps for the transfer of cars from cage to dump and vice versa.

8. In combination, a plurality of cages for raising and lowering mine cars, track supports on the cages for the mine cars, a plurality of rotary dumps disposed on each side of the cages when in raised position, track sections in said dumps adapted to form continuations of the cage tracks, and selective means for transferring cars from the cages to the dumps and vice versa.

9. In combination, a plurality of cages for raising and lowering mine cars, track supports on the cages for the mine cars, a plurality of rotary dumps on each side of the cage when in raised position, track sections in said dumps adapted to form continuations of the cage tracks, rams operable through the dumps for the transfer of cars from cage to dump and vice versa, and mechanism for moving the said several dumps in predetermined relationship for receiving and dumping the cars.

10. In combination, a mine car hoist mechanism comprising two cages carrying car supporting track sections disposed transversely thereof, a tipple structure carrying tracks on each side at right angles to the cage tracks, rotary dumps adapted to roll on said tracks and carrying track sections adapted for form continuations of the tracks when elevated, means to transfer the cars from the cage tracks to the dump tracks and vice versa, and means to roll the dumps to invert the car, substantially as described.

11. In combination, a mine car hoist mechanism comprising two cages carrying car supporting track sections disposed transversely thereof, a tipple structure carrying tracks on each side at right angles to the cage tracks, rotary dumps adapted to roll on said tracks and carrying track sections adapted to form continuations of the tracks when elevated, means to transfer the cars from the cage tracks to the dump and vice versa, and means to roll the dumps in predetermined relationship, bringing the dumps on the opposite sides of one cage into car transferring position while the other dumps are moved to car dumping position, substantially as described.

12. In combination, a tipple carrying parallel tracks, a pair of rotary dumps adapted to roll on each track, means to maintain the spaced relationship of the dumps on each track, a common means to move corresponding dumps of each pair alternately into receiving and dumping positions, a mine car hoist mechanism adapted to alternately present loaded cars into position to be transferred to the dumps in receiving position, and a common means for moving all the dumps in unison, substantially as described.

13. In combination, a plurality of mine hoists, a plurality of rotary dumps on each side of said hoists, a common drive means to move the dumps in unison, bringing opposite pairs thereof alternately into car receiving and dumping positions, and means to transfer the cars between the dumps and a cage when the former are in car receiving position relative to said cage.

14. In combination, a plurality of mine hoists, a plurality of rotary dumps on each side of said hoists, means to move the dumps in unison, bringing opposite pairs thereof alternately into car receiving and dumping positions, means to transfer the cars between the dumps and a cage when the former are in car receiving position relative to said cage, and means to prevent the operation of the transfer means until the dumps reach their car receiving positions.

15. The combination with mine car hoisting, transferring and dumping mechanisms, of a safety means controllable by the dumping mechanism and operable to prevent the operation of the transfer mechanism when the dumping mechanism is away from its car receiving or discharging position.

16. The combination with mine car hoisting, transferring and dumping mechanisms, of coöperating safety means controllable by the hoisting and dumping mechanism and operable to prevent the operation of the transfer mechanism when either of said other mechanisms are away from their car receiving or discharging positions.

17. The combination with a mine car dumping mechanism, of transfer mechanism operable to shift mine cars to and from the dumping mechanism, and safety means controllable by the position of the transfer mechanism when out of its normal retracted position to prevent the operation of the dumping mechanism.

18. The combination with a mine car dumping mechanism, of transfer rams operable to shift mine cars to and from the dumping mechanism, and safety means controllable by the dumping mechanism and operable to prevent the operation of the transfer rams when the dumping mechanism is away from its car receiving or discharging position.

19. In combination, a plurality of rotary dumps, car transferring rams operable through said dumps, cages movable to present mine cars in position between opposite dumps, and mechanism controllable by the cages when away from transfer position to prevent the operation of their respective rams.

20. In combination, rotary dumps, a plurality of car transferring rams operable through said dumps, cages movable into position between opposite dumps, and mechanism controllable by the dumps to prevent the operation of a ram when its respective cage is away from transfer position.

21. In combination, a plurality of rotary dumps, transfer rams operable through the dumps, cages adapted to move mine cars into position between opposite dumps, control mechanisms for the rams and dumps operable from a common point of control, and safety mechanism adapted normally to prevent the operations of the rams and dumps and which is movable by said cages to release the rams and dumps for operation in a predetermined manner, substantially as described.

22. The combination with mine car hoisting, transferring and dumping mechanisms, of control levers for said mechanisms, counter-weights movable into position to lock said levers against operation, and means controllable by the hoisting, transferring and dumping mechanisms for manipulating said counter-weights, substantially as described.

23. The combination with a hoist having tracks, of a dumping structure containing tracks adapted in one position to aline with the hoist tracks, means to turn the dump structure to dump the contents of a car thereon, means to cause the loaded car to pass from the hoist onto the dump tracks, and a ram having a wheel supported pusher head disposed to travel axially through the dumping structure on tracks therein to transfer an empty car therefrom onto the hoist.

24. The combination with a rotary dump having members for holding down the wheels of a mine car therein, of a ram movable through the dump and having its head mounted on mine car wheels adapted to travel under said hold-downs, substantially as described.

In testimony whereof I affix my signature.

ERSKINE RAMSAY.

Witness:
R. D. CURRY.